United States Patent
Disdero et al.

(10) Patent No.: US 9,983,774 B2
(45) Date of Patent: May 29, 2018

(54) AUTHORING AND CONSUMING OFFLINE AN INTERACTIVE DATA ANALYSIS DOCUMENT

(71) Applicant: TIBCO Software Inc., Palo Alto, CA (US)

(72) Inventors: Christopher Disdero, Everett, WA (US); Kim Petter Ake Ahlberg, Seattle, WA (US); William J. Bernhard, Seattle, WA (US)

(73) Assignee: TIBCO Software Inc., Palo Alto, CA (US)

( * ) Notice: Subject to any disclaimer, the term of this patent is extended or adjusted under 35 U.S.C. 154(b) by 192 days.

(21) Appl. No.: 14/976,237

(22) Filed: Dec. 21, 2015

(65) Prior Publication Data

US 2017/0177201 A1    Jun. 22, 2017

(51) Int. Cl.
G06F 3/0484 (2013.01)
G06F 17/30 (2006.01)
G06F 3/0482 (2013.01)

(52) U.S. Cl.
CPC ........ G06F 3/04847 (2013.01); G06F 3/0482 (2013.01); G06F 17/30554 (2013.01)

(58) Field of Classification Search
CPC .............. G06F 3/04847; G06F 3/0482; G06F 17/30554
See application file for complete search history.

(56) References Cited

U.S. PATENT DOCUMENTS

| 2007/0010966 | A1* | 1/2007 | Kim | G06F 17/30539 702/181 |
| 2015/0089424 | A1* | 3/2015 | Duffield | G06Q 10/00 715/771 |
| 2015/0243059 | A1* | 8/2015 | Matange | G06Q 30/00 345/440 |

OTHER PUBLICATIONS

Michael Alexander, Knowing How Crystal Xcelsius Works, http://www.dummies.com/how-to/content/knowing-how-crystal-xcelsius-works.html, Dec. 4, 2015.
OLAP cube, https://en.wikipedia.org/wiki/OLAP_cube, Dec. 4, 2015.
Online analytical processing, https://en.wikipedia.org/wiki/Online_analytical_processing, Dec. 4, 2015.
Autocaptured screenshots from http://myxcelsius.com/wp-content/videos/IntroductiontoCrystalXcelsius.mp4, Jan. 19, 2009.
Transcription of http://myxcelsius.com/wp-content/videos/IntroductiontoCrystalXcelsius.mp4, Jan. 19, 2009.

* cited by examiner

*Primary Examiner* — Andrey Belousov
*Assistant Examiner* — Seth A Silverman
(74) *Attorney, Agent, or Firm* — McGuire Woods LLP

(57) ABSTRACT

One or more user interactions, selected from a plurality of user interactions, and one or more visualization types, selected from a plurality of visualization types are received. Predetermined visualization data associated with displaying an interactive data analysis document is determined based at least in part on the selected user interactions and the selected visualization types. The predetermined visualization data is output.

15 Claims, 14 Drawing Sheets

| Raw Data (300) | Visualization Type (302) |
|---|---|
| #, location | map |
| #, #, location<br>#, #, category | scatter plot |
| #, category, location | grid of maps |
| multiple categories | tree map |
| category, number of numerical columns | parallel coordinate plot |
| #, date or time | line chart |

310 — #, location / map
312 — #, #, location; #, #, category / scatter plot
314 — #, category, location / grid of maps
316 — multiple categories / tree map
318 — category, number of numerical columns / parallel coordinate plot
320 — #, date or time / line chart

FIG. 3

AUTHORING AND CONSUMING OFFLINE AN INTERACTIVE DATA ANALYSIS DOCUMENT

BACKGROUND OF THE INVENTION

Some computer systems generate so much raw data that it is difficult for a user to consume or otherwise process. For example, the data may relate to sales or transactions for a nation-wide chain of stores and large amounts of information may be recorded during a busy sales season. Or, the data may be biometric information, such as genome data, from a medical study which also tends to be very large. Visual representations of raw data and/or visual analysis tools enable users to analyze and/or ingest large amounts of data. Although systems which provide such visual representations and/or analysis tools exist, new techniques which permit the user to operate in new environments and/or mitigate the burden of expanding the number of devices or users supported would be desirable.

BRIEF DESCRIPTION OF THE DRAWINGS

Various embodiments of the invention are disclosed in the following detailed description and the accompanying drawings.

FIG. 3 is a diagram illustrating an embodiment of raw data and corresponding visualization types.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
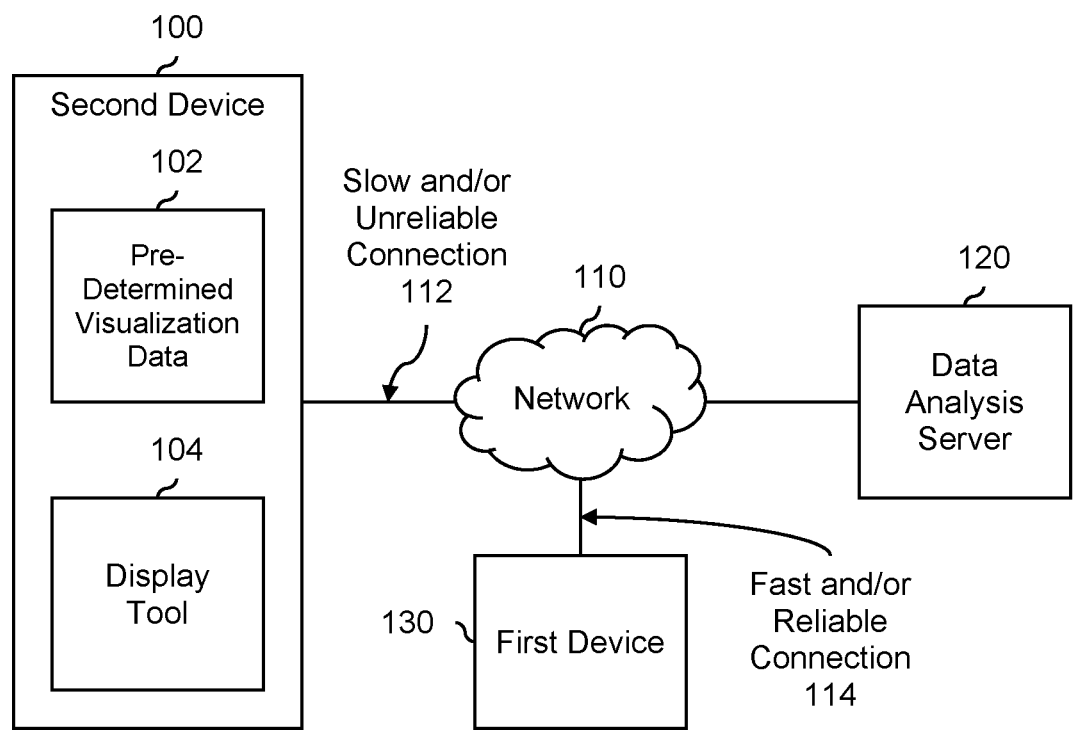
FIG. 1 is a system diagram illustrating an embodiment of a system which generates and consumes predetermined visualization data in order to support user interaction with an interactive data analysis document.

FIG. 1 is a system diagram illustrating an embodiment of a system which generates and consumes predetermined visualization data in order to support user interaction with an interactive data analysis document. In the example shown, data analysis server 120 visually presents some raw data, for example in the form of graphs, plots, charts, etc. Data analysis server 120 also provides or otherwise supports a wide variety of interactions, services, and/or tools for visually analyzing the data and/or changing the visual presentation. As used herein, the term "interactive data analysis document" refers to the visual presentation, including any visualizations (such as graphs, plots, etc.), any controls, and/or any other visual elements displayed in response to the user's commands (e.g., best-fit curves, grid lines, legends, axes, etc.). More detailed examples of interactive data analysis documents are described below.

Data analysis server 120 supports user interaction with the interactive data analysis document in a variety of ways depending upon (as an example) the particular device a user is using. First, an example where data analysis server 120 performs calculations and/or processing in a real-time, on-the-fly manner in response to a user of first device 130 is described. Then, an example where data analysis server 120 does the calculations and/or processing ahead of time (e.g., in anticipation of) for a user of second device 100 is described.

The first device (130) has a fast and/or reliable connection (114) via network 110 to data analysis server 120. In one example, first device 130 is a desktop computer and the fast and/or reliable connection is a wired (e.g., Ethernet) connection. Since the first device has a fast and/or reliable connection, data analysis server 120 is capable of responding in real-time (e.g., doing any processing on-the-fly) to a user's instructions and/or selections with respect to the interactive data analysis document at desktop computer 130. In addition, in some embodiments, a user at first device 130 may have access to a full set of visualization- and/or analysis-related tools, controls, services, etc.

In contrast, the second device (100) has a slow and/or unreliable connection (112) to network 110. For example, the second device may be smartphone and the slow and/or unreliable connection (112) may be via a cellular data network (e.g., 3G or 4G) or Wi-Fi. As such, data analysis server 120 generates predetermined visualization data (102) which is stored locally on the second device so that the second device does not need to contact data analysis server 120 in order to respond to a user's interactions with the interactive data analysis document.

The predetermined visualization data (102) is referred to as visualization data because the data relates to information necessary to display or otherwise render the interactive data analysis document, including any displayed or rendered responses to user interactions with said document. For example, the interactive data analysis document may include a bar graph and the predetermined visualization data includes the necessary information to display each of the various bars in the bar graph. The predetermined visualization data would include the size of each bar (e.g., relative to the bar graph), the position of each bar (e.g., relative to the bar graph), the color to display for each bar, a fill pattern for each bar, a transparency percentage for each bar, etc.

The predetermined visualization data (102) anticipates and predetermines (as an example) all possible visual or graphical information needed to display the interactive data analysis document for some set of permitted or specified user selections or interactions (e.g., permitting only certain filtering functions to be applied to the raw data but not others) and/or some set of permitted or specified visualizations (e.g., just a bar graph but not other visualizations). To continue the bar graph example from above, the predetermined visualization data would include (e.g., for all possible, permitted user interactions with the interactive data analysis document and permitted visualizations) all possible bar sizes, bar positions, bar colors, bar fill patterns, bar transparency percentages, etc.

The second device (100) also includes a display tool (104) which displays the interactive data analysis document based on the user's interactions and the information stored in the predetermined visualization data. For example, given bar sizes, bar positions, and so on specified in predetermined visualization data, the display tool would be able to display a bar graph (with the appropriate bars) that is appropriate for a particular state for a particular visualization. Generally speaking, based on the current state for the current visualization, the display tool knows what visualization data to access (e.g., from predetermined visualization data 102) and updates the display of the interactive data analysis document accordingly.

In some embodiments, the display tool is lightweight in the sense that the display tool does not include any resource-intensive operations. For example, suppose data analysis server 120 determines an $R^2$ value (i.e., the coefficient of determination) for a set of raw data selected by the user. For a user at first device 130, data analysis server 120 would calculate the $R^2$ value on-the-fly when provided the selected raw data on which to perform the $R^2$ calculation. However, since the calculation is very resource-intensive, display tool 104 does not calculate an $R^2$ value on-the-fly in response to a user's request, but rather knows the appropriate visualization data to obtain from the predetermined visualization data and would thus be able to display or otherwise render graphical information corresponding to the appropriate $R^2$ information (e.g., graphical information to render a box or legend with the $R^2$ value displayed in said box).

In some embodiments, predetermined visualization data 102 describes relative sizes and/or positions and display tool 104 scales the size and/or position accordingly. This may be desirable because the same predetermined visualization data can be generated for different screen sizes (e.g., tablet versus phone), for different screen orientations (e.g., portrait versus landscape), and/or for different screen aspect ratios. In some embodiments, the user may have the option of selecting a single visualization to be displayed, or the option of displaying a grid of visualizations (e.g., 4 quadrants). In some such embodiments, the relative sizes and/or relative positions permit the same predetermined visualization data to be used regardless of whether a particular visualization (e.g., a bar graph) is being displayed alone or within one or more positions within a grid.

In some embodiments, the interactions and/or features supported on the second device (100) using the predetermined visualization data (102) is a reduced set of interactions and/or features compared to what a user on the first device (130) is able to access. This may be desirable because it limits the size of predetermined visualization data 102 and the users may accept a reduced feature set on second device 100. Some examples are described below in more detail.

In some embodiments, display tool 104 supports some (e.g., lightweight) graphical or visual processes which are performed on-the-fly. For example, display tool 104 may support some animation so that a graphical object (e.g., a data point in a scatter plot, a bar in a bar graph, etc.) fades in/out, moves from one position to another, grows/shrinks, etc. The related processing may be based (for example) on the starting and ending position, size, or other graphical information which are wholly described by the predetermined visualization data. For the reasons described above, it may be desirable for such supported animation to be lightweight operations so that power and/or processor resources are not excessively consumed on second device 100.

There are a number of benefits to the exemplary system shown herein. One benefit is that a user of the second device is able to interact with the interactive data analysis document even if connection 112 goes down or is slow. For example, if the second device is a smartphone, then there may be times when there is no connection to a WiFi or cellular data network (e.g., 3G or 4G), or such a connection is very slow.

Even if there is a fast and/or reliable connection to the data analysis server, it may be desirable to support an interactive data analysis document using predetermined visualization data because it offloads the processing burden on the data analysis server. This means that the system can be expanded (i.e., more users/devices added to the system) without having to upgrade data analysis server 120 at the rate which would otherwise be required. Without predetermined visualization data, all of the users/devices would contact the data analysis server for support. This would require the data analysis server to be upgraded at a faster rate when expanding the system compared to when predetermined visualization data is used.

Another benefit is that since the display tool is lightweight (e.g., because it only has to render the display-related information in predetermined visualization data as opposed to performing more complex, analytical calculations), power consumption at second device 100 is relatively low. This is attractive if second device 100 is a smartphone, tablet, or other battery-operated, mobile device. In some other example, second device 100 is a smart TV, a laptop, or desktop computer.

Another benefit to the system shown is that different types of (e.g., operating) systems can be supported in an easier manner. For example, suppose second device 100 is an iPhone which runs iOS and that first device 130 and data analysis server 120 operate on some other operating system or platform, such as Windows operating system or LINUX. Creating an iPhone application which both runs on iOS and which performs even some of the analysis operations supported by data analysis server 120 would be difficult to implement (e.g., building an interpolation or extrapolation tool which runs on iOS). However, because the predetermined visualization data 102 describes display-related information (which can be agnostic of the operating system or platform associated with second device 100), multiple platforms or operating systems can be supported using a single version of predetermined visualization data so long as there is a corresponding version of the display tool for a particular platform or operating system. Since building a display tool is an easier task than building even a stripped-down version of the data analysis server, the task of supporting different types of platforms or operating systems is made simpler.

The following figure describes a process for generating predetermined visualization data.

Figure 2:
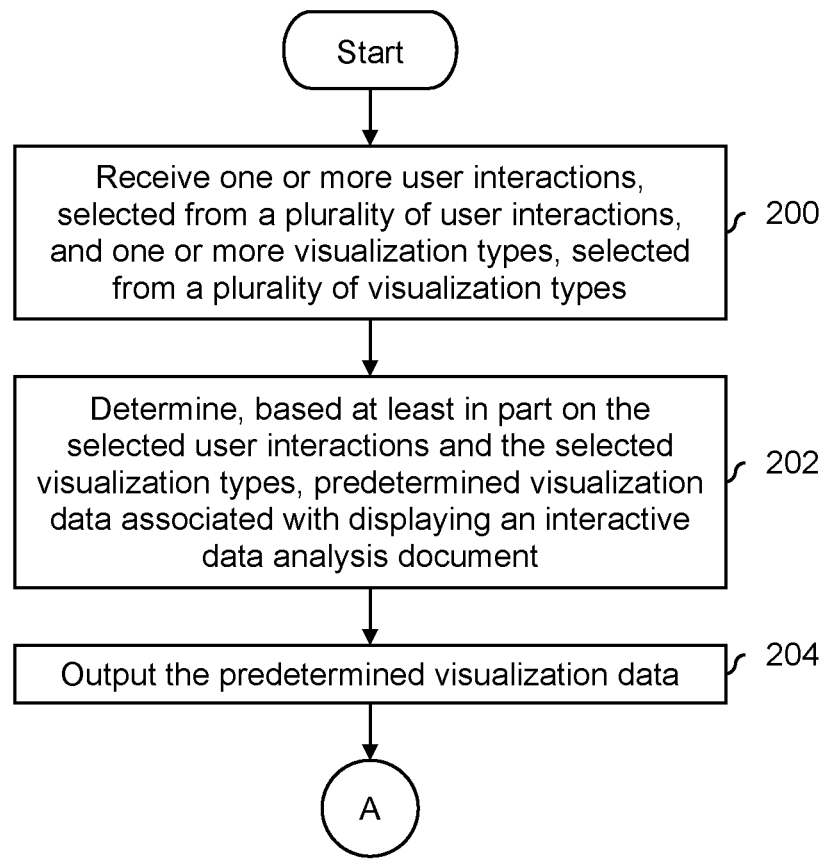
FIG. 2 is a flowchart illustrating an embodiment of a process to generate predetermined visualization data.

FIG. 2 is a flowchart illustrating an embodiment of a process to generate predetermined visualization data. In FIG. 1, data analysis server 120 may perform the process of FIG. 2 in order to generate predetermined visualization data for second device 100.

At 200, one or more user interactions, selected from a plurality of user interactions, and one or more visualization types, selected from a plurality of visualization types, are received. The term "visualization" refers to any visual representation of some raw data. Some examples of visualization types include (but are not limited to) maps, scatter plots, line charts, bar graphs, pie charts, etc.

The term "user interaction" refers to any interaction by the user with the interactive data analysis document. Some examples includes highlighting, selecting, and/or marking a data marker directly in a visualization, adjusting a slider bar, clicking a checkbox or a radio button, making a selection from a pulldown menu, initiating some operation on some selected set of raw data such as initiating a forecasting operation (e.g., which causes a corresponding forecast curve be displaying), adjusting a number of things to display (e.g., a number of columns, a number of data points, etc.), selecting a source of raw data to display, adjusting a display setting (e.g., linear scale versus logarithmic scale), etc. These are just some examples and are not intended to be limiting.

Using FIG. 1 as an example, the visualization types and user interactions may be selected from a full-featured interactive data analysis document which a user at first device 130 would observe. To put it another way, the interactive data analysis document which a user at second device 100 would observe (and which is displayed and interacted with using predetermined visualization data 102) supports a reduced set of visualization types and/or user interactions.

The selected user interactions received at step 200 may sometimes be referred to as permitted user interactions, because the user interactions selected at 200 are the ones which will be supported or recognized. For example, in FIG. 1, if a user at second device 100 does something that is not one of the user interactions selected at 200, the system may alert the user and ignore the user's actions, or alternatively contact the data analysis server 120 for predetermined visualization data for this specific interaction.

In one example, suppose that a user of first device 130 in FIG. 1 has the ability to adjust a slider bar with a high degree of precision (e.g., to the hundredths place, so that a user could select the value 19.24). To keep the amount of predetermined visualization data to a reasonable amount, the selected user interactions at step 200 may limit the user's interaction with the slider so that a user can only select integer numbers (e.g., 19 or 20 but not 19.24) using that slider bar. However, the overall analysis offered would still be meaningful in most cases.

In some embodiments, selected visualizations and associated controls (e.g., via which the user can interact with the interactive data analysis document) are presented in pages to the user. In some embodiments, visualization types and user interactions are selected by page number (e.g., selecting page X causes all of the visualization types and user interactions displayed in that page to be selected). In some such embodiments, the user interface for authoring or otherwise generating predetermined visualization data presents pages (including visualizations and associated controls) and permits the user to select things by page and/or individual graphical objects or elements within a page (if desired).

In various embodiments, selection of the user interactions and/or visualization types may be done in a variety of ways. Some examples are described in more detail below.

At 202, predetermined visualization data associated with displaying an interactive data analysis document is determined based at least in part on the selected user interactions and the selected visualization types. For example, suppose one of the selected visualization types is a map with icons representing income levels of people in different zip codes. Further suppose that the selected user interactions include the ability for the user to specify both an income range (e.g., min_income and max_income, specified to the nearest $10,000) and a number of zip codes to display (e.g., num_zip, where if num_zip=2 then the 2 zip codes with the most people in the specified income range are displayed). For each possible combination of (min_income, max_income, num_zip), display information such as the location of each of the icons and the size of each icon (e.g., because in this example the size of an icon scales with the number of people within a specified income range) are determined. Other predetermined visualization data may be determined if there are other visualization types (e.g., scatter plots, line graphs, etc.). Conceptually speaking, the predetermined visualization data anticipates (for the selected visualization types and selected user interactions) the various displays that might be presented and determines ahead of time the display-related information for the display tool to render the appropriate graphical objects or elements.

At 204, the predetermined visualization data is output. For example, in FIG. 1, the predetermined visualization data is sent from data analysis server 120 to second device 100. Display tool 104 would select the appropriate visualization data from predetermined visualization data 102 in order to display or otherwise render the appropriate visualization and other graphical elements in the interactive data analysis document. This would enable a user at second device 100 to interact with an interactive data analysis document without having to communicate with data analysis server 120.

In some applications, new raw data is generated frequently. For example, the raw data may relate to purchases or transactions. Or, the raw data may relate to posts or other interactions on social media. In some such applications, the process of FIG. 2 is performed periodically and/or automatically in order to generate predetermined visualization data which incorporates the new raw data. For example, the process of FIG. 2 may be performed on a daily basis and new predetermined visualization data may be distributed on a daily basis so that users can interact with up-to-date data. Since generation of the predetermined visualization data may be time-consuming and/or processing-intensive, the process may be performed when the processing resources are more readily available, such as late at night or very early in the morning. In some embodiments, the same selection of user interactions and visualization types at step 200 is reused until a user changes the selection.

In various embodiments, new predetermined visualization data may either supplement existing predetermined visualization data (e.g., where, if desired, some of the older predetermined visualization data expires) or wholly replace the previous set of predetermined visualization data. In one example, when predetermined visualization data is prepared for a given set of interactions, that data replaces or updates existing data for those same interactions.

The following figures show some example interactive data analysis documents, including exemplary visualization types (e.g., maps, scatter plots, line charts, etc.), which are supported using predetermined visualization data. The following figures also illustrate some examples of user interactions which are supported using predetermined visualization data as described in FIG. 2.

FIG. 3 is a diagram illustrating an embodiment of raw data and corresponding visualization types. In the example shown, the left column (300) describes some raw data examples and the right column (302) describes some example visualization types. As shown in row 310, if the raw data includes numbers and locations, then a map may be used. If the raw data includes two numbers and locations or two numbers and categories, then a scatter plot may be used (row 312). If the raw data includes numbers, categories, and locations, then a grid of maps may be used (row 314). (More generally, a grid may comprise a grid of same visualization types or a grid of different visualization types.) In row 316, if the raw data includes multiple categories, then a tree map may be used. If the raw data includes categories and numbers of numerical columns, then a parallel coordinate plot may be used (row 318). If the raw data includes numbers and dates or time, then a line chart may be used (row 320). Some other examples include a table plot, a pie chart, a donut chart, or a KPI tile grid. These are just some examples and are not intended to be limiting.

Figure 4A:
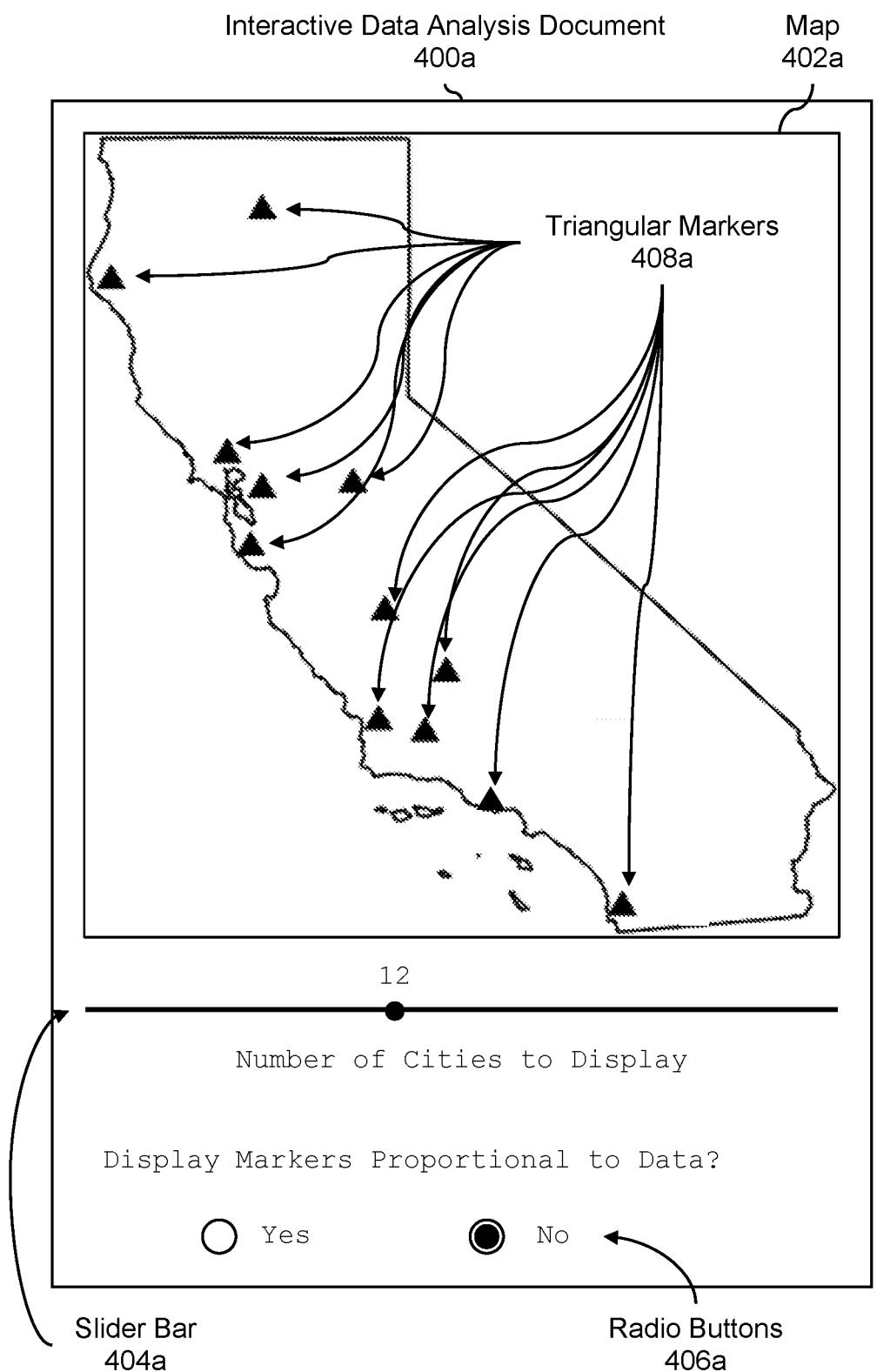
FIG. 4A is a diagram illustrating an embodiment of an interactive data analysis document, supported using predetermined visualization data, which includes a map and is in a first state.

FIG. 4A is a diagram illustrating an embodiment of an interactive data analysis document, supported using predetermined visualization data, which includes a map and is in a first state. In the example shown, interactive data analysis document 400a includes a map (402a). The map includes 12 triangular markers (408a). The number of cities to display is controlled by slider bar 404a, which is currently set to 12. As such, 12 triangular markers (408a) are shown in map 402a. Interactive data analysis document 400a also includes radio buttons 406a, which enable the user to change whether the size of the markers is proportional to the raw data. In the state shown, the radio buttons are set to "No" so that the size of the markers (408a) is not proportional to the raw data.

The following figure shows the same interactive data analysis document after the user changes the radio buttons so that the size of the markers displayed is proportional to the raw data.

Figure 4B:
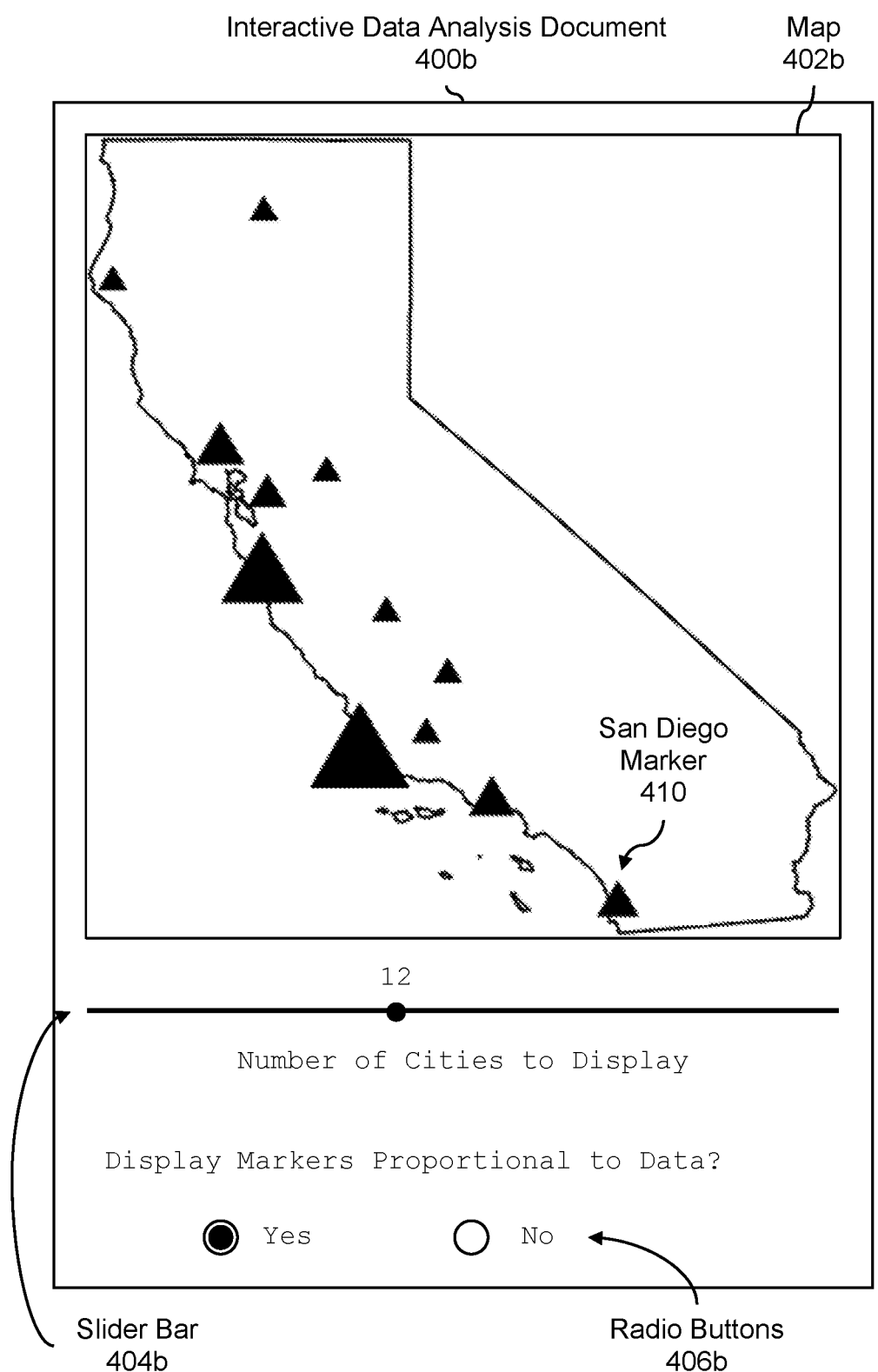
FIG. 4B is a diagram illustrating an embodiment of an interactive data analysis document, supported using predetermined visualization data, which includes a map and is in a second state.

FIG. 4B is a diagram illustrating an embodiment of an interactive data analysis document, supported using predetermined visualization data, which includes a map and is in a second state. FIG. 4B continues the example of FIG. 4A. In the example shown, the user has changed the radio button selection (406b) so that the size of the triangular markers is proportional to the raw data. In response, a display tool (not shown) obtains at least some new visualization data in order to update at least some of the triangular markers (408b). For example, the position of San Diego marker 410 may be the same in FIGS. 4A and 4B, but the size of the marker may be larger and the retrieved new visualization data for San Diego marker 410 includes a larger size. The display tools knows this and draws San Diego marker 410 accordingly based on the retrieved visualization data from the predetermined visualization data.

In some embodiments, the entire map, including all of the markers, are redrawn, even if the size and the position of some graphical elements or objects remains the same (e.g., there are some markers with the same size and position and the map of California stays the same).

As described above, the user interactions and/or visualization types which are selected and used to generate the predetermined visualization data (see step 200 in FIG. 2) may comprise a reduced set in order to keep the amount of predetermined visualization data to a reasonable amount. As such, in this example, slider bar 404a is restricted to even number and the predetermined visualization data includes the display-related information necessary to display 2 cities with same-sized markers, 2 cities with proportionally-sized markers, 4 cities with same-sized markers, 4 cities with proportionally-sized markers, etc.

In contrast, an interactive data analysis document for which a data analysis server performs calculations in real time and/or on-the-fly may be permitted to select any integer number, including odd numbers.

In this example, the predetermined visualization data also includes display-related data to render the map of California, the slider bar and its associated elements (e.g., the dot showing the current position of the slider bar, the legend "Number of Cities to Display," and "13" or "14"), and the radio buttons and their associated elements (e.g., both the selected and unselected radio buttons and the legends "Display Markers Proportional to Data?," "Yes," and "No.").

In some embodiments, some of the predetermined visualization data is described in relative terms. For example, using map 402a/402b as an example, the size and/or position of the triangular markers may be relative to map 402a/402b (e.g., from the lower left corner). In some embodiments this is desirable because it permits the display tool to scale the visualization (e.g., a map) or interactive data analysis document to a variety of screen sizes (e.g., tablet versus smartphone), a variety of screen orientations (e.g., portrait versus landscape), and/or a grid of multiple visualizations versus a single visualization. Hardcoded or absolute sizes and/or positions might make the interactive data analysis document more inflexible with respect to these things.

To further limit the size of the predetermined visualization data, a user of interactive data analysis document 400a/400b is not permitted to select triangular markers 408*a*/408*b*, for example by clicking on a marker using a mouse. When predetermined visualization data is not used, selecting a marker may cause the color or tone of that particular marker to change; this is sometimes referred to as marking. Generating the visualization data to support marking would require additional space in the interactive data analysis document but does not necessarily contribute to the analysis or consumption of the raw data by a user. As such, in some embodiments, selection of an object in a visualization (e.g., without some action or task being performed on the selected object or corresponding raw data), is not one of the selected user interactions from which predetermined visualization data is generated.

In some embodiments, a user has limited set of display options when predetermined visualization data is used. For example, with predetermined visualization data, the user may be limited to triangular markers (since in this example only one type or category of data is being displayed). Other users of the interactive data analysis document (e.g., which do not use the predetermined visualization data) may be able to change the type of markers (e.g., circular markers, star markers, square markers, etc.) according to their preference but this would require additional space in the predetermined visualization data without contributing meaningfully to the analysis. A user would still be able to meaningfully analyze the raw data with a fixed type or style of markers.

Figure 5:
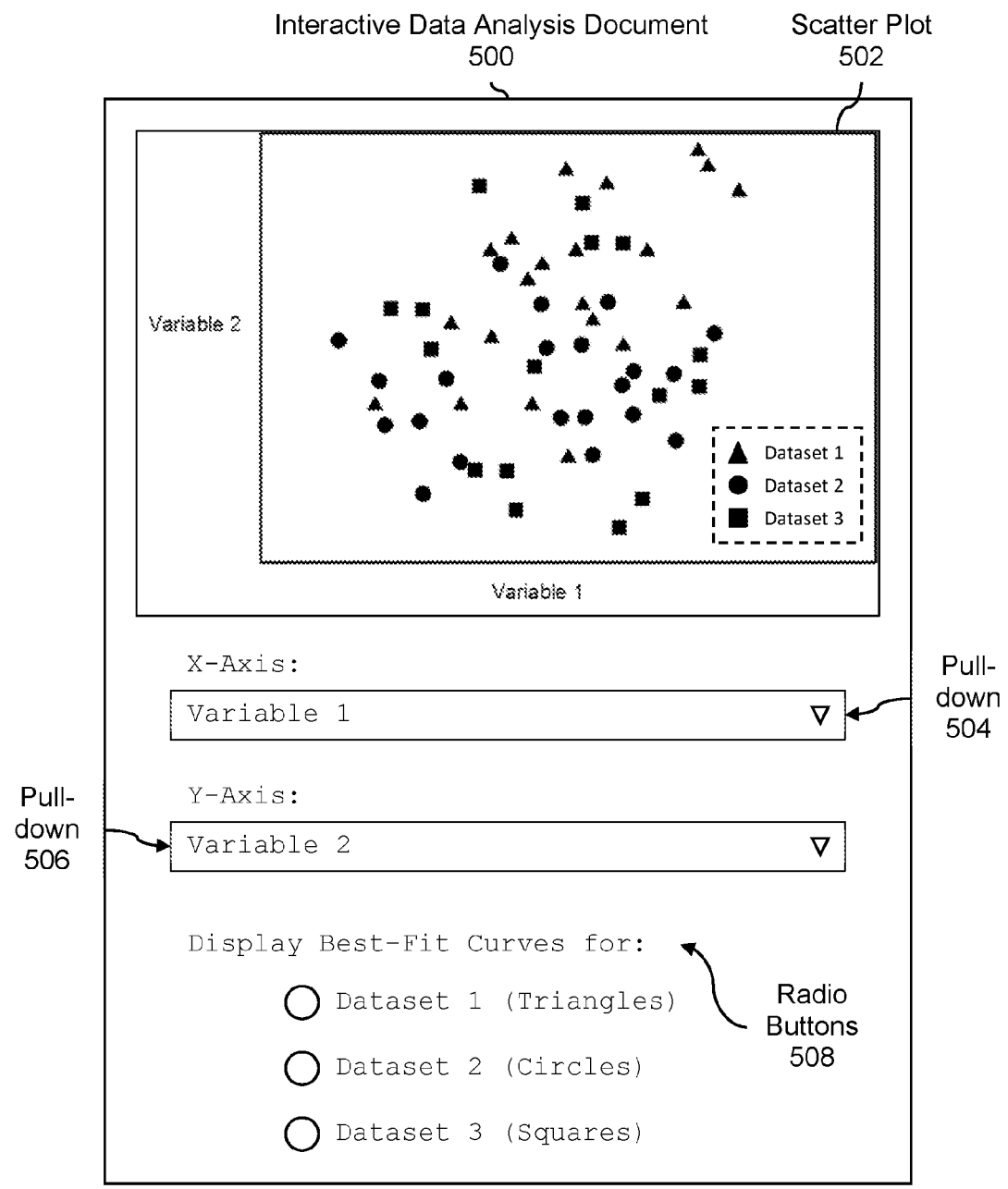
FIG. 5 is a diagram illustrating an embodiment of an interactive data analysis document, supported using predetermined visualization data, which includes a scatter plot.

FIG. 5 is a diagram illustrating an embodiment of an interactive data analysis document, supported using predetermined visualization data, which includes a scatter plot. In the example shown, interactive data analysis document 500 includes a scatter plot (502). Using pulldown menus 504 and 506, a user specifies what variable to use for the x-axis and what variable to use for the y-axis in scatter plot 502. In the state shown, the user has selected variable 1 for the x-axis and variable 2 for the y-axis. There may be any number of additional variables (e.g., variable 3, variable 4, etc.) associated with the three exemplary datasets.

In addition to being able to select which variables to use for the axes, the user is able to (if desired) display any number of best-fit curves for the first dataset, the second dataset, and/or the third dataset. In the state shown here, no best-fit curves are displayed. For each of the possible combinations of user interactions (e.g., (x_axis=var_1, y_axis=var_2, best_fit_1=No, best_fit_2=No, best_fit_3=No), (var_1, var_2, No, No, Yes), (var_1, var_2, No, Yes, No), etc.), the predetermined visualization data would include the visualization data needed to display or otherwise render the appropriate objects for each combination in the visualization.

In some embodiments, when predetermined visualization data is not used, a user is able to specify the degree of the polynomial to use for the best-fit curve. For example, if the user wants a best fit line (e.g., $y=\alpha x+\beta$), then the user would specify num_degrees=1. If the user wants to use a second-order polynomial (e.g., $y=\alpha x^2+\beta x+\gamma$), then the user would specify num_degrees=2. In some embodiments, to keep the amount of predetermined visualization data to a reasonable amount, the best-fit curve(s) which are able to be displayed using predetermined visualization data are limited (e.g., a single type of best-fit curve, such as those constructed only using second-order polynomials). In one example, the most popular type of best fit curve (e.g., first-order polynomial, second-order polynomial, etc.) is used to generate the predetermined visualization data. The predetermined visualization data for the best-fit curve in such embodiments would include (as an example) where each best-fit curve is located, the color, the thickness, and any other information needed to draw the best-fit curve in the visualization (e.g., scatter plot 502). Generally speaking, the selected user interactions at step 200 in FIG. 2 may include a reduced and/or fixed number of degrees associated with a polynomial.

Figure 6:
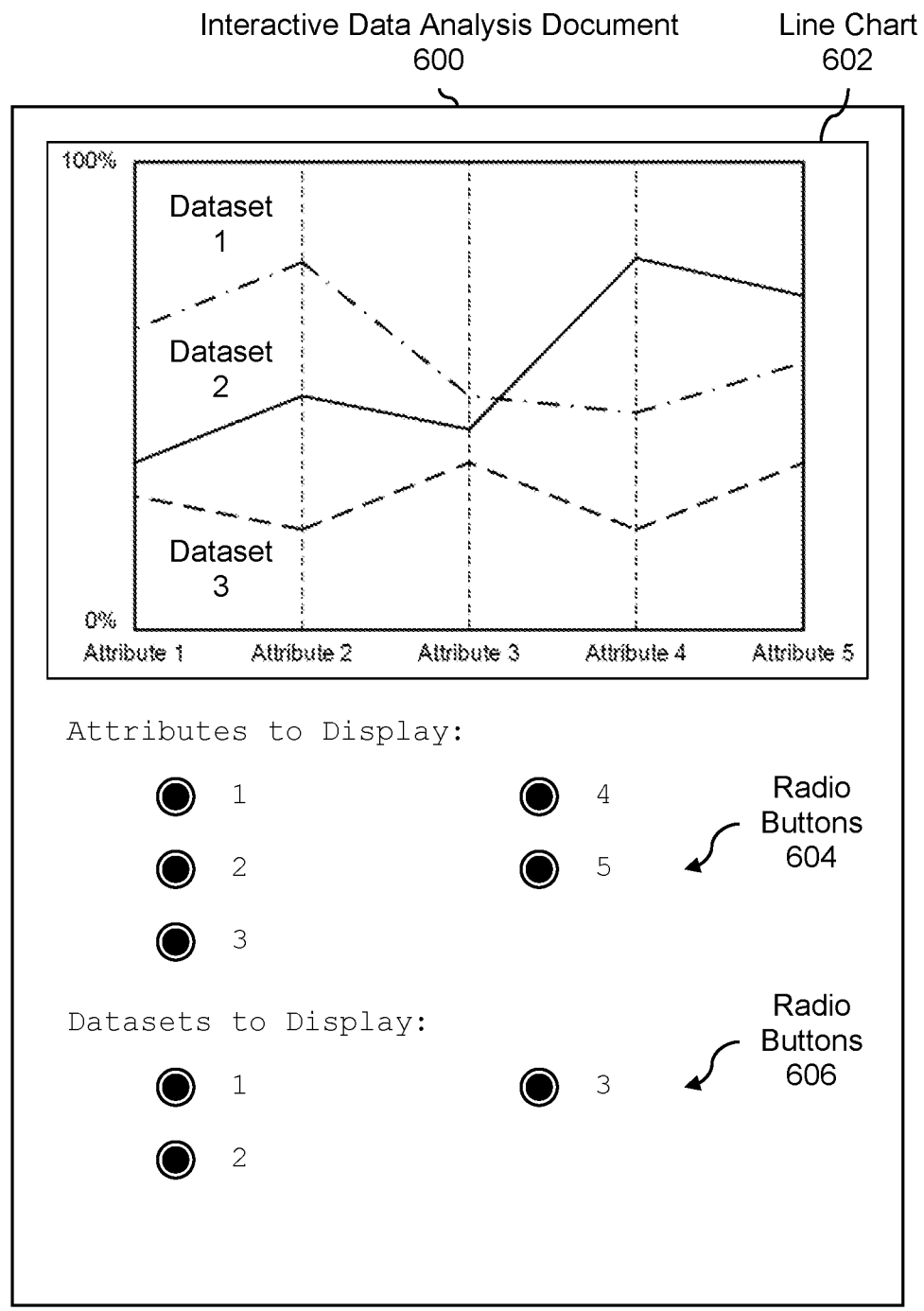
FIG. 6 is a diagram illustrating an embodiment of an interactive data analysis document, supported using predetermined visualization data, which includes a line chart.

FIG. 6 is a diagram illustrating an embodiment of an interactive data analysis document, supported using predetermined visualization data, which includes a line chart. In the example shown, interactive data analysis document 600 includes a line chart (602). Using radio buttons 604, a user can select what attributes to display in line chart 602. In the state shown, all of attributes 1-5 are selected and displayed. Using radio buttons 606, a user can select the datasets to display. In the state shown, all of datasets 1-3 are selected and displayed.

If a user were to deselect one of the attributes to display, then the display tool would retrieve corresponding predetermined visualization data. In one example, the retrieved visualization data would cause the vertical lines corresponding to the remaining attributes to be redrawn (i.e., shifted) so that the remaining vertical lines representing the remaining attributes are evenly distributed (e.g., so that there is no gap where the vertical line corresponding to the de-selected attribute was). Similarly, the retrieved visualization data would cause the legends for the remaining attributes (e.g., "Attribute 1," "Attribute 2", etc. along the bottom of line chart 602) to be shifted a similar amount so that the legends line up with the shifted vertical lines.

As described above, in some embodiments, the display tool has the ability to animate the change. For example, the remaining vertical lines may move gradually into their new positions. Similarly, the vertical line corresponding to the de-selected attribute may fade out. In some embodiments, the associated processing to perform such animation and/or visual effects is not power- and/or processing-intensive and the display tool and/or the device on which the display tool operates is able to handle such processing.

Figure 7A:
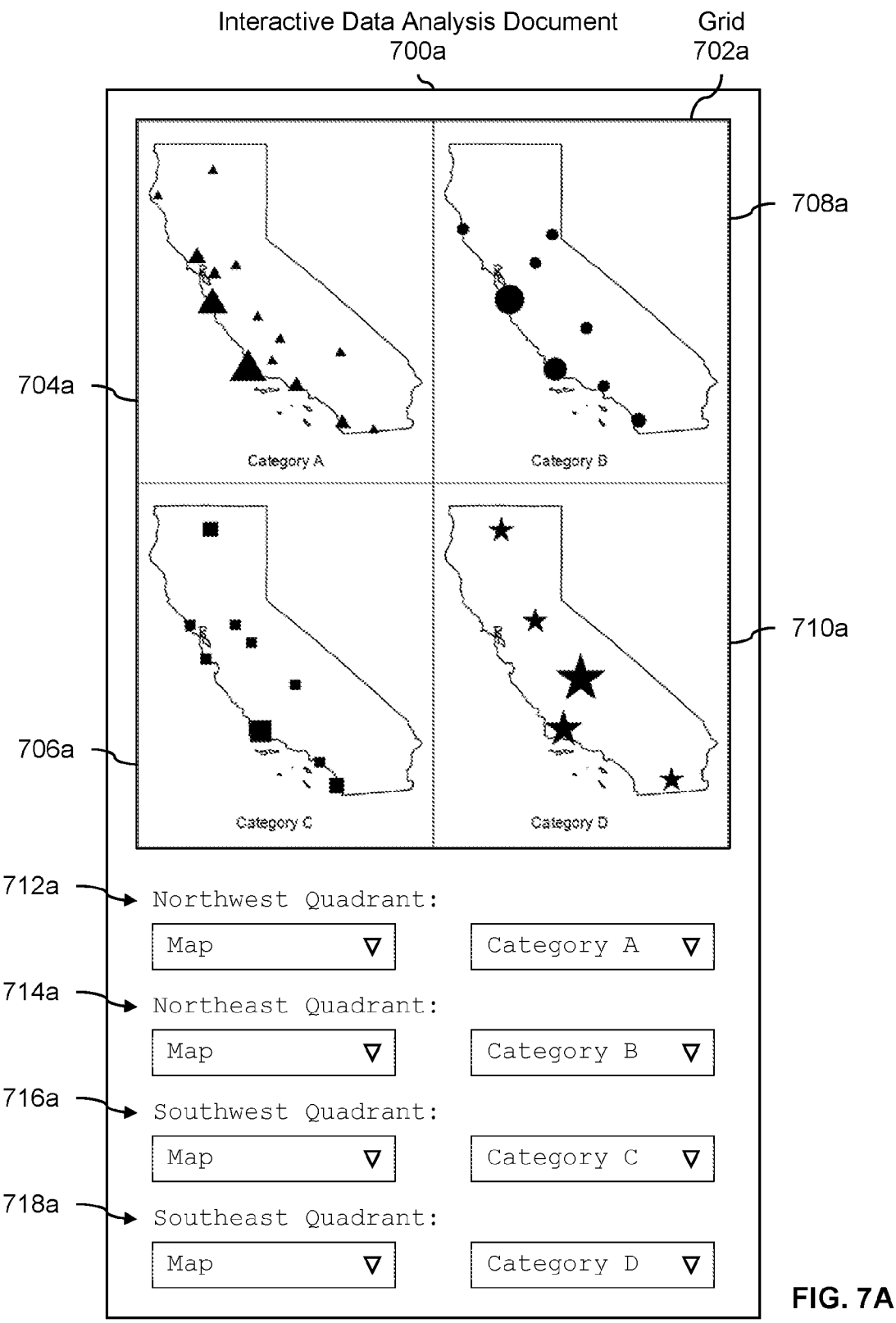
FIG. 7A is a diagram illustrating an embodiment of an interactive data analysis document, supporting using predetermined visualization data, which includes a grid of the same visualization types.

FIG. 7A is a diagram illustrating an embodiment of an interactive data analysis document, supporting using predetermined visualization data, which includes a grid of the same visualization types. In the example shown, interactive data analysis document 700*a* includes a grid of visualizations where the user is able to select each of the 4 visualizations in the grid. In the state shown, all of the visualizations are maps. Pulldown menu 712*a* controls the visualization in the northwest quadrant (704*a*), pulldown menu 714*a* controls the visualization in the northeast quadrant (708*a*), pulldown menu 716*a* controls the visualization in the southwest quadrant (706*a*), and pulldown menu 718*a* controls the visualization in the southeast quadrant (710*a*). In the example shown, the right-hand pulldown menus are used to make visualization-specific selections. In the state shown, the right-hand pulldown menus are used to select which category to display for each map.

As described above, in this example, the predetermined visualization data is described in relative terms, for example with respect to some reference point. In some applications this is desirable because it permits the display tool to render a particular visualization (e.g., the map) in any of the four quadrants or even by itself (see, e.g., FIGS. 4A and 4B using the same predetermined visualization data. This may permit more compact predetermined visualization data while supporting a variety of visualizations (e.g., a map in one or more places in a grid, as well as by itself).

The following figure shows the interactive data analysis document after the user had changed some of the pulldown menus.

Figure 7B:
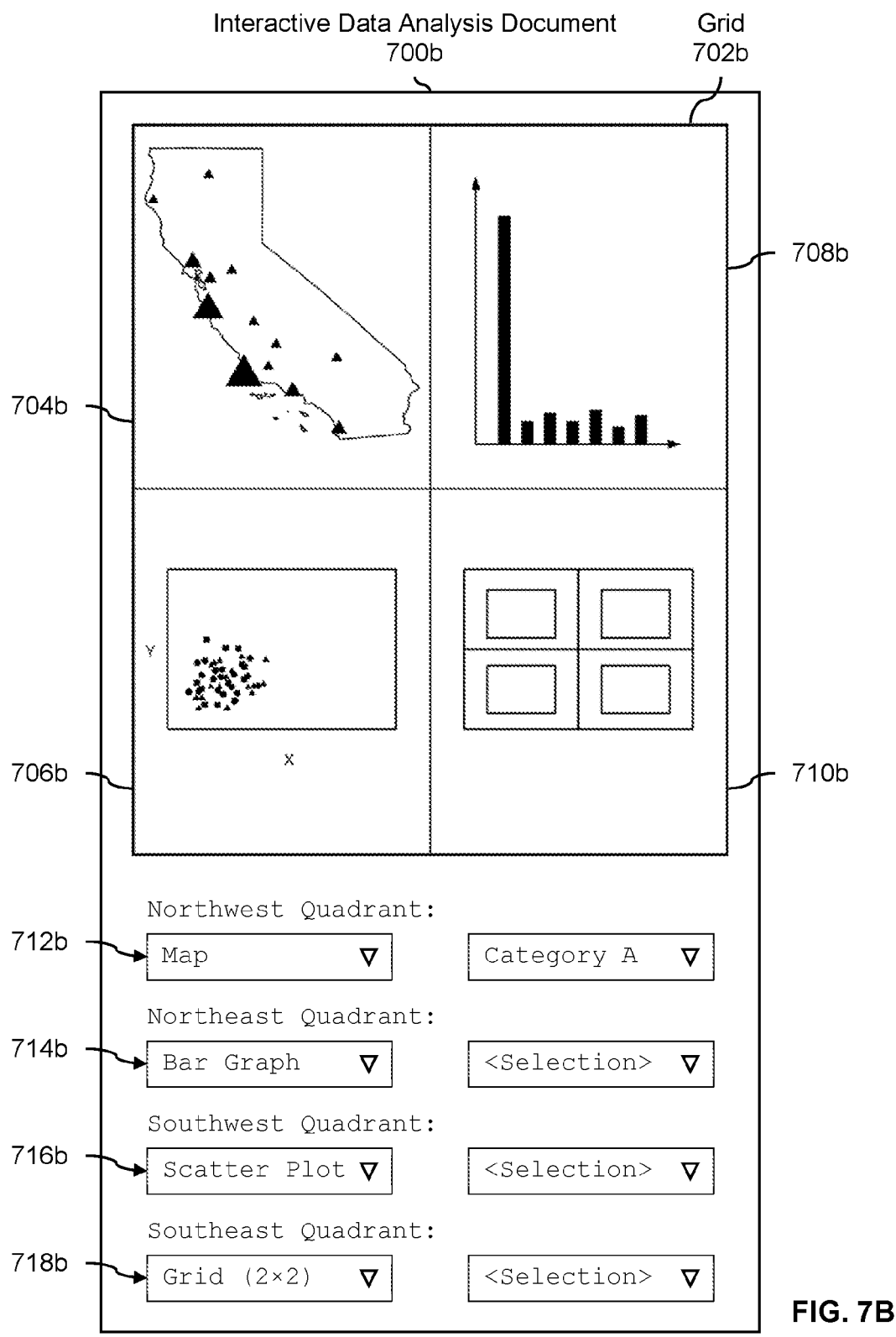
FIG. 7B is a diagram illustrating an embodiment of an interactive data analysis document, supporting using predetermined visualization data, which includes a grid of different visualization types.

FIG. 7B is a diagram illustrating an embodiment of an interactive data analysis document, supporting using predetermined visualization data, which includes a grid of different visualization types. FIG. 7B continues the example of FIG. 7A.

In the example shown, the user has changed the selections in pulldown menus 714b, 716b, and 718b so that quadrants 708b, 706b, and 710b show a bar graph, a scatter plot, and a 2×2 grid, respectively.

The right-hand pulldown menus in pulldown menus 714b, 716b, and 718b have been updated from pulldown menus 714a, 716a, and 718a in FIG. 7A to show bar graph-specific, scatter plot-specific, and grid-specific options, respectively. Naturally, there may be any number of pulldown menu options or other new controls which appear or disappear depending upon the current state and/or the user's interactions with interactive data analysis document. In this example, the predetermined visualization data includes the display-related information to redraw or otherwise render the appropriate controls (e.g., pulldown menus, radio buttons, slider bars, etc.) based on the current state and/or user's interactions the interactive data analysis document.

As described above, the selected user interactions and/or selected visualization types which are used to generate the predetermined visualization data may be obtained in a variety of ways at step 200 in FIG. 2. The following figures show some examples.

Figure 8:
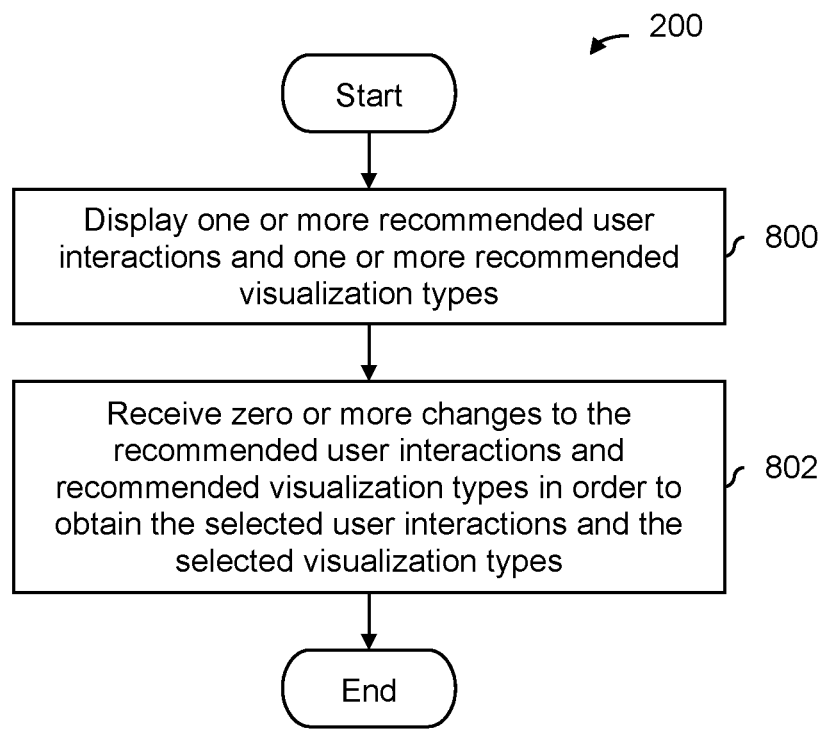
FIG. 8 is a flowchart illustrating an embodiment of a process for receiving selected user interactions.

FIG. 8 is a flowchart illustrating an embodiment of a process for receiving selected user interactions. In some embodiments, the process is performed by a data analysis server (see, e.g., data analysis server 120 in FIG. 1) which authors, publishes, or otherwise generated predetermined visualization data. In some embodiments, the process of FIG. 8 is performed as part of step 200 in FIG. 2.

At 800, one or more recommended user interactions and one or more recommended visualization types are displayed. Some examples of how the recommend user interactions and recommended visualization types are obtained are described in more detail below.

At 802, zero or more changes to the recommended user interactions and recommended visualization types are received in order to obtain the selected user interactions and the selected visualization types. For example, the user may opt to go with the recommendations, or may opt to modify the recommendations in some manner.

It is noted that this is merely one way to obtain the selections. In some embodiments, once the user interactions and visualization types have been selected by a user, the selections are saved and reused for subsequent regeneration of the predetermined visualization data. This may be particularly useful if the predetermined visualization data is generated on a relatively frequent basis (e.g., daily).

Figure 9:
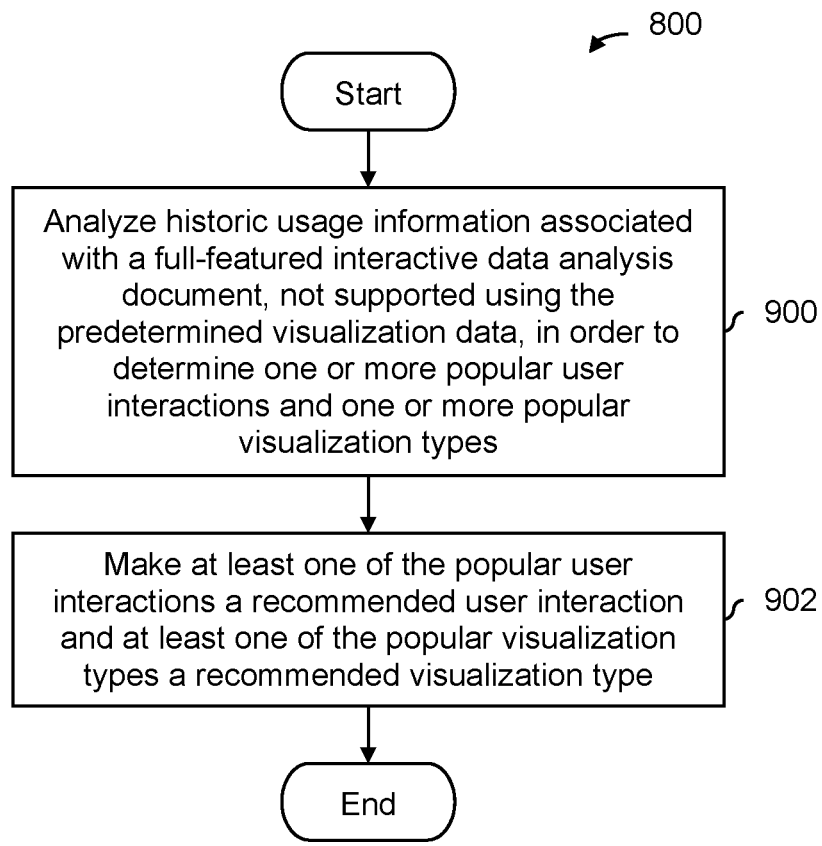
FIG. 9 is a flowchart illustrating an embodiment of a process for selecting recommended user interactions and recommended visualization types by analyzing historic usage information associated with a full-featured interactive data analysis document.

FIG. 9 is a flowchart illustrating an embodiment of a process for selecting recommended user interactions and recommended visualization types by analyzing historic usage information associated with a full-featured interactive data analysis document. In some embodiments, the process of FIG. 9 is used at step 800 in FIG. 8. In some embodiments, the process is performed by data analysis server 120 in FIG. 1. In some embodiments, the process of FIG. 9 is performed before any predetermined visualization data is generated (e.g., to come up with one more recommendations when generating predetermined visualization data for the first time).

At 900, historic usage information associated with a full-featured interactive data analysis document, not supported using the predetermined visualization data, is analyzed in order to determine one or more popular user interactions and one or more popular visualization types. For example, the full-featured interactive data analysis document may be the one which a user at first device 130 in FIG. 1 would see. In some embodiments, historic usage information from multiple users/devices is analyzed.

At 902, at least one of the popular user interactions is made a recommended user interaction and at least one of the popular visualization types is made a recommended visualization type.

In some embodiments, the process of FIG. 9 is performed before predetermined visualization data is generated for the first time. In some embodiments, the process of FIG. 9 is performed periodically, for example to catch changing user preferences.

Figure 10:
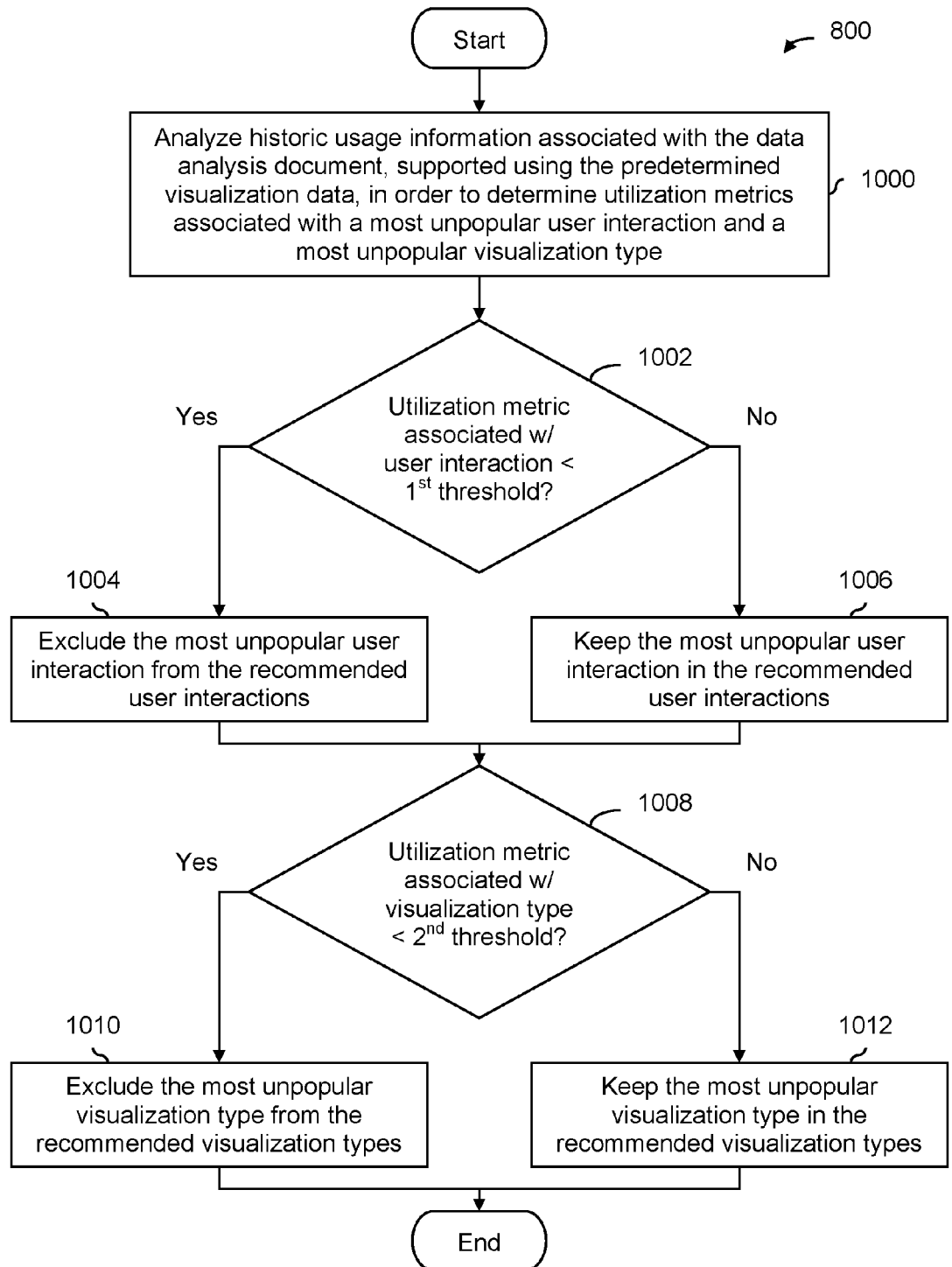
FIG. 10 is a flowchart illustrating an embodiment of processes for selecting recommended user interactions and recommended visualization types by analyzing historic usage information associated with an interactive data analysis document which is supported using predetermined visualization data.

FIG. 10 is a flowchart illustrating an embodiment of processes for selecting recommended user interactions and recommended visualization types by analyzing historic usage information associated with an interactive data analysis document which is supported using predetermined visualization data. In some embodiments, the process of FIG. 10 is included at step 800 in FIG. 8. In some embodiments, the process is performed by data analysis server 120 in FIG. 1.

At 1000, historic usage information associated with the data analysis document, supported using the predetermined visualization data, is analyzed in order to determine utilization metrics associated with a most unpopular user interaction and a most unpopular visualization type. For example, in FIG. 1, the historic user interactions may come from a user at second device 100 after the user has had time to interact with the interactive data analysis document. In some embodiments, historic information from multiple users/devices is analyzed.

At 1002, it is determined whether the utilization metric associated with the most unpopular user interaction is less than a first threshold. Some examples of the utilization metric include: a percentage or number of all users who have used the user interaction at least once, the average number of times per day the user interaction is used, etc.

If the utilization metric is determined to be less than the first threshold at 1002, then the most unpopular user interaction is excluded from the recommended user interactions at 1004. If the utilization metric is determined to be greater than the first threshold at 1002, then the most unpopular user interaction is kept in the recommended user interactions at 1006. In other words, the most unpopular user interaction (from the user interactions included in the predetermined visualization data) is culled from the recommended user interactions if it is not being used to a sufficient degree. This may reduce the likelihood that that user interaction will be used to generate the predetermined visualization data.

After step 1004 or step 1006, it is determined at 1008 if the utilization metric associated with the most unpopular visualization type is less than a second threshold. Similar to above, the utilization metric may be the percentage or number of all users who have used the visualization type at least once, the average number of times per day the visualization type is used, etc.

If so, the most unpopular visualization type is excluded from the recommended visualization types at 1010. If not, the most unpopular visualization type is kept in the recommended visualization types at 1012. For example, if users rarely use maps (where maps are included in the predetermined visualization data) then it may be desirable to remove maps from the recommended visualization types.

In some embodiments, the process of FIG. 10 is performed when predetermined visualization data has been generated at least once. This may be useful in culling any user interaction or visualization type which is included in the predetermined visualization data but is underutilized.

Naturally, although the processes of FIGS. 9 and 10 test whether to include/exclude a most popular/unpopular user interaction and/or visualization type in some recommended list, any number of user interactions and/or visualization types may be tested in this manner.

As described above, although predetermined visualization data permits a user to interact with an interactive data analysis document without having a network connection to a data analysis server, it is not necessary for a network connection to be absent in order for predetermined visualization data to be used. The following figure describes an example in which a network connection with a data analysis server is used to generate additional visualization data for some user interaction and/or visualization type not included in the predetermined visualization data.

Figure 11:
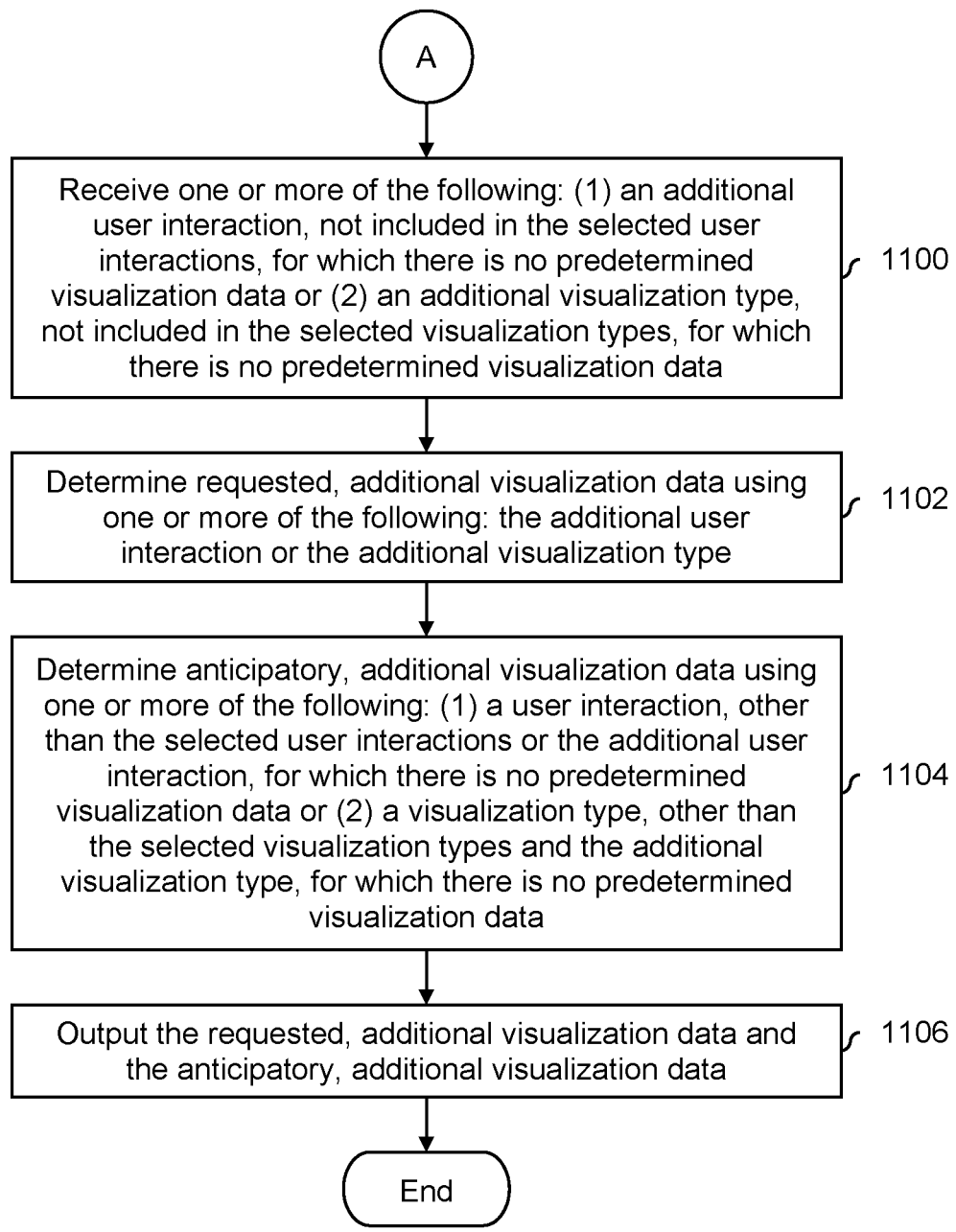
FIG. 11 is a flowchart illustrating an embodiment of a process for providing additional predetermined visualization data.

FIG. 11 is a flowchart illustrating an embodiment of a process for providing additional predetermined visualization data. In some embodiments, the process of FIG. 11 follows the process of FIG. 2. As with the process of FIG. 2, the process of FIG. 11 is performed by a data analysis server (e.g., data analysis server 120 in FIG. 1).

At 1100, one or more of the following is received: (1) an additional user interaction, not included in the selected user interactions, for which there is no predetermined visualization data or (2) an additional visualization type, not included in the selected visualization types, for which there is no predetermined visualization data. For example, to save space, the predetermined visualization data may not include certain visualization types or user interactions. However (e.g., if so configured), the interactive data analysis document may still include controls which would require some visualization data not included in the predetermined visualization data. In some cases, only additional user interaction(s) is/are received, only additional visualization(s) is/are received, or some combination of additional user interaction(s) and additional visualization(s) are received.

At 1102, requested, additional visualization data is determined using one or more of the following: the additional user interaction or the additional visualization type. To put it another way, additional visualization data corresponding to what was requested by the data analysis client is generated.

At 1104, anticipatory, additional visualization data is determined using one or more of the following: (1) a user interaction, other than the selected user interactions or the additional user interaction, for which there is no predetermined visualization data or (2) a visualization type, other than the selected visualization types and the additional visualization type, for which there is no predetermined visualization data. In other words, visualization data beyond what was requested by the data analysis client is generated and as such, the visualization data generated at step 1104 is labeled "anticipatory."

In one example, suppose that at step 1100 a requested user interaction associated with displaying a first-order best-fit line is received because the user asks specifically for a best-fit curve using a first-order polynomial. In this example, the visualization (in this case, a scatter plot) already exists but there is no predetermined visualization data for any best-fit curves. At step 1102, visualization data associated with a first-order best-fit line would be generated. At step 1104, visualization data for other best-fit curves may be generated, including a second-order best-fit curve, a third-order best-fit curve, etc.

In another example, at step 1100, the additional visualization type is a map and the additional user interaction is associated with selecting what data to map using one or more thresholds (e.g., map the selected data less than the threshold, map the selected data greater than the threshold, or map the selected data between the thresholds). At step 1102, visualization data associated with rendering or otherwise displaying the map with the selected data per the threshold(s) is generated. At step 1104, visualization data associated with displaying the map with one or more other sets of selected data may be generated (e.g., a set of sub-sampled data using some specified sampling frequency).

At 1106, the requested, additional visualization data and the anticipatory, additional visualization data are output. For example, in FIG. 1, the requested, additional visualization data and the anticipatory, additional visualization data are sent from data analysis server 120 to second device 100. In some embodiments, the additional visualization data (both requested and anticipatory) replace the existing predetermined visualization data. In some embodiments, the additional visualization data may supplement the existing predetermined visualization data. In one example, the additional visualization data adds to or otherwise updates existing data and replaces data that is exactly the same for a given state and rule. In some applications this may be attractive because each interaction rule and subsequent state is always unique.

Generating and sending anticipatory, additional visualization data in addition to requested, additional visualization data may be desirable because it avoids the possibility that the user will subsequently request some visualization type and/or user interaction for which there no predetermined visualization data (again) and the user will have to wait (again) for the visualization data to be generated by the data analysis server.

In some embodiments, before FIG. 11 is performed, a data analysis client (e.g., on second device 100 in FIG. 1) checks to see if network access to a data analysis server is available. Since FIG. 11 is from the point of view of a data analysis server, that step is not shown herein.

In some embodiments, before FIG. 11 is performed, the data analysis client checks with the user for permission and/or to let them know what is happening. For example, the display tool may display, "I do not have a graph available right now. Would you like me to contact the data analysis server? This may take a few minutes." This may properly set up user expectations about the response time since it may take a few minutes or longer for the data analysis server to respond. In some cases, the user may prefer to stick with available visualization types and/or user interactions that are included in the predetermined visualization data to avoid waiting. As before, since FIG. 11 is from the point of view of a data analysis server, that step is not shown herein.

The following figure is a more detailed example of how predetermined visualization data is organized. In some embodiments, a data analysis server generates predetermined visualization data with the following exemplary sections so that rendering of the interactive data analysis document can be achieved faster.

Figure 12:
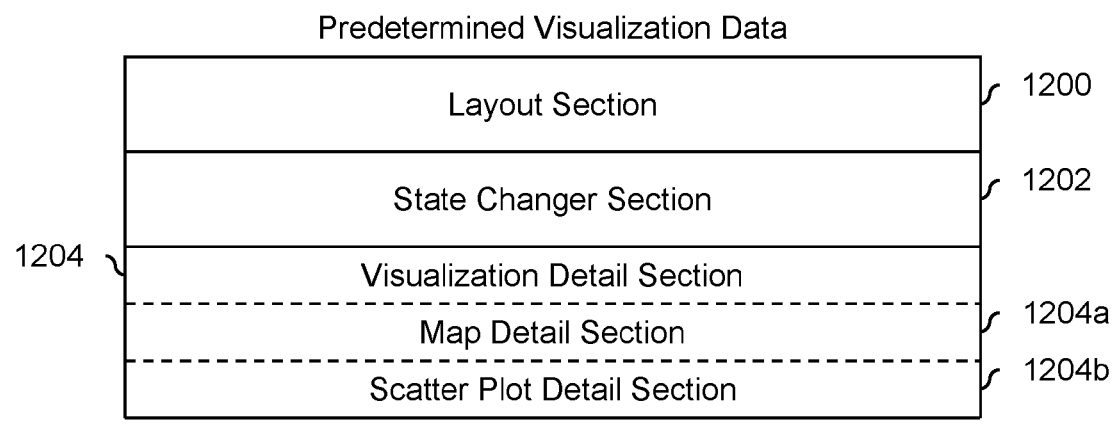
FIG. 12 is a diagram illustrating an embodiment of the organization of predetermined visualization data.

FIG. 12 is a diagram illustrating an embodiment of the organization of predetermined visualization data. In the example shown, predetermined visualization data includes three sections: the layout section (1200), the state changer section (1202), and the visualization detail section (1204). In this particular example, the visualization detail section(s) includes a map detail section (1204a) and a scatter plot detail section (1204b).

In this example, the layout section (1200) includes page and visualization layout information for the interactive data analysis document. The layout section is processed by a display tool first in this example. This enables the pages and spaces for visualizations within an interactive data analysis document to be displayed quickly (e.g., with the renderings or displays within the spaces or layout filled in later).

The state changer section (1202) includes the type of action(s) supported (e.g., for a given state within a given visualization), the possible choices that can be selected (e.g., for a given state within a given visualization), and other controls for a given state within a given visualization. In this example, this section is processed after the layout section and enables the display tool to render controls for the interactive data analysis document (e.g., slider bars, radio buttons, pulldown menus, etc.).

In this particular example, visualization detail section (1204) includes map detail section 1204a and scatter plot detail section 1204b. Map detail section 1204a includes the various rules and states for a map and scatter plot detail section 1204b includes the various rules and states for a scatter plot.

The visualization detail section (1204) includes a set of rules and states for each visualization listed in layout section (1200). Generally speaking, the rules let the display tool know what state (e.g., within a particular visualization type) to go to next based on the current state (for that particular visualization) and the user's interactions with the interactive data analysis document. For example, going from FIG. 4A to FIG. 4B shows an example of going from one state to another state within the same visualization. Going from FIG. 4B to FIG. 5 shows an example of going from one state in one visualization to another state in another visualization. For example, the rules in the map detail section (1204a) would let the display tool know to go from FIG. 4A to FIG. 4B or from FIG. 4B to FIG. 5 depending upon the user instructions.

The states describe what objects or elements to display in that state of the visualization, including all of the information necessary to display those objects or elements. For example, a first state in the map detail section (1204a) would include for the exemplary state shown in FIG. 4A (i.e., (12 cites, not proportional)) all of the 12, same-sized triangular markers, the map of California, etc. A second state in the map detail section (1204a) would include for state shown in FIG. 4B (i.e., (12 cites, proportional)) all of the 12, proportionally-sized triangular markers, the map of California, etc. Naturally other states (e.g., (2 cites, not proportional), (2 cities, proportional), (4 cites, not proportional), (4 cities, proportional), etc.) are included in the map detail section.

In this example, each visualization section (e.g., map detail section 1204a and scatter plot detail section 1204b) has an initial near the top of the list or section so that the display tool can quickly render the initiate state of each visualization (e.g., while the rest of that visualization detail section is processed).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive one or more user interactions, selected from a plurality of user interactions, and one or more visualization types, selected from a plurality of visualization types, including by:
displaying one or more recommended user interactions and one or more recommended visualization types, including by:
analyzing historic usage information associated with an interactive data analysis document, supported using predetermined visualization data, in order to determine utilization metrics associated with a most unpopular user interaction and a most unpopular visualization type;
determining if the utilization metric associated with the most unpopular user interaction is less than a first threshold;
in the event it is determined that the utilization metric associated with the most unpopular user interaction is less than the first threshold, excluding the most unpopular user interaction from the recommended user interactions;
in the event it is determined that the utilization metric associated with the most unpopular user interaction is greater than the first threshold, keeping the most unpopular user interaction in the recommended user interactions;
determining if the utilization metric associated with the most unpopular visualization type is less than a second threshold;
in the event it is determined that the utilization metric associated with the most unpopular visualization type is less than the second threshold, excluding the most unpopular visualization type from the recommended visualization types; and
in the event it is determined that the utilization metric associated with the most unpopular visualization type is greater than the second threshold, keeping the most unpopular visualization type in the recommended visualization types; and
receiving zero or more changes to the recommended user interactions and recommended visualization types in order to obtain the selected user interactions and the selected visualization types;
determine, based at least in part on the selected user interactions and the selected visualization types, the predetermined visualization data associated with displaying the interactive data analysis document, wherein the determination of the predetermined visualization data is performed on a data analysis server;
store the predetermined visualization data determined by the data analysis server on a computing device; and
display the interactive data analysis document on the computing device, including by accessing the predetermined visualization data stored on the computing device such that the computing device is able to display the interactive data analysis document without communicating with the data analysis server in response to a decision that a connection to the data analysis server is too slow or is unavailable.

2. The system recited in claim 1, wherein the predetermined visualization data is output to one or more of the following: a smartphone, a tablet, a smartwatch, a smart TV, a laptop, or desktop computer.

3. The system recited in claim 1, wherein the selected visualization types includes one or more of the following: a map, a scatter plot, a grid of same visualization types, a grid of different visualization types, a tree map, a parallel coordinate plot, a line chart, a table plot, a bar graph, a pie chart, a donut chart, or a KPI tile grid.

4. The system recited in claim 1, wherein displaying the recommended user interactions and the recommended visualization types includes:
 analyzing historic usage information associated with a full-featured interactive data analysis document, not supported using the predetermined visualization data, in order to determine one or more popular user interactions and one or more popular visualization types; and
 making at least one of the popular user interactions a recommended user interaction and at least one of the popular visualization types a recommended visualization type.

5. The system recited in claim 1, wherein the memory is further configured to provide the processor with instructions which when executed cause the processor to:
 receive one or more of the following: (1) an additional user interaction, not included in the selected user interactions, for which there is no predetermined visualization data or (2) an additional visualization type, not included in the selected visualization types, for which there is no predetermined visualization data;
 determine requested, additional visualization data using one or more of the following: the additional user interaction or the additional visualization type;
 determine anticipatory, additional visualization data using one or more of the following: (1) a user interaction, other than the selected user interactions or the additional user interaction, for which there is no predetermined visualization data or (2) a visualization type, other than the selected visualization types and the additional visualization type, for which there is no predetermined visualization data; and
 output the requested, additional visualization data and the anticipatory, additional visualization data.

6. A method, comprising:
 receiving one or more user interactions, selected from a plurality of user interactions, and one or more visualization types, selected from a plurality of visualization types, including by:
  displaying one or more recommended user interactions and one or more recommended visualization types, including by:
   analyzing historic usage information associated with an interactive data analysis document, supported using predetermined visualization data, in order to determine utilization metrics associated with a most unpopular user interaction and a most unpopular visualization type;
   determining if the utilization metric associated with the most unpopular user interaction is less than a first threshold;
   in the event it is determined that the utilization metric associated with the most unpopular user interaction is less than the first threshold, excluding the most unpopular user interaction from the recommended user interactions;
   in the event it is determined that the utilization metric associated with the most unpopular user interaction is greater than the first threshold, keeping the most unpopular user interaction in the recommended user interactions;
   determining if the utilization metric associated with the most unpopular visualization type is less than a second threshold;
   in the event it is determined that the utilization metric associated with the most unpopular visualization type is less than the second threshold, excluding the most unpopular visualization type from the recommended visualization types; and
   in the event it is determined that the utilization metric associated with the most unpopular visualization type is greater than the second threshold, keeping the most unpopular visualization type in the recommended visualization types; and
  receiving zero or more changes to the recommended user interactions and recommended visualization types in order to obtain the selected user interactions and the selected visualization types;
 determining, based at least in part on the selected user interactions and the selected visualization types, the predetermined visualization data associated with displaying the interactive data analysis document, wherein the determination of the predetermined visualization data is performed on a data analysis server;
 storing the predetermined visualization data determined by the data analysis server on a computing device; and
 displaying the interactive data analysis document on the computing device, including by accessing the predetermined visualization data stored on the computing device such that the computing device is able to display the interactive data analysis document without communicating with the data analysis server in response to a decision that a connection to the data analysis server is too slow or is unavailable.

7. The method recited in claim 6, wherein the predetermined visualization data is output to one or more of the following: a smartphone, a tablet, a smartwatch, a smart TV, a laptop, or desktop computer.

8. The method recited in claim 6, wherein the selected visualization types includes one or more of the following: a map, a scatter plot, a grid of same visualization types, a grid of different visualization types, a tree map, a parallel coordinate plot, a line chart, a table plot, a bar graph, a pie chart, a donut chart, or a KPI tile grid.

9. The method recited in claim 6, wherein displaying the recommended user interactions and the recommended visualization types includes:
 analyzing historic usage information associated with a full-featured interactive data analysis document, not supported using the predetermined visualization data, in order to determine one or more popular user interactions and one or more popular visualization types; and
 making at least one of the popular user interactions a recommended user interaction and at least one of the popular visualization types a recommended visualization type.

10. The method recited in claim 6 further comprising:
 receiving one or more of the following: (1) an additional user interaction, not included in the selected user interactions, for which there is no predetermined visualization data or (2) an additional visualization type, not included in the selected visualization types, for which there is no predetermined visualization data;

determining requested, additional visualization data using one or more of the following:

the additional user interaction or the additional visualization type;

determining anticipatory, additional visualization data using one or more of the following: (1) a user interaction, other than the selected user interactions or the additional user interaction, for which there is no predetermined visualization data or (2) a visualization type, other than the selected visualization types and the additional visualization type, for which there is no predetermined visualization data; and outputting the requested, additional visualization data and the anticipatory, additional visualization data.

11. A computer program product, the computer program product being embodied in a non-transitory computer readable storage medium and comprising computer instructions for:

receiving one or more user interactions, selected from a plurality of user interactions, and one or more visualization types, selected from a plurality of visualization types, including by:

displaying one or more recommended user interactions and one or more recommended visualization types, including by:

analyzing historic usage information associated with an interactive data analysis document, supported using predetermined visualization data, in order to determine utilization metrics associated with a most unpopular user interaction and a most unpopular visualization type;

determining if the utilization metric associated with the most unpopular user interaction is less than a first threshold;

in the event it is determined that the utilization metric associated with the most unpopular user interaction is less than the first threshold, excluding the most unpopular user interaction from the recommended user interactions;

in the event it is determined that the utilization metric associated with the most unpopular user interaction is greater than the first threshold, keeping the most unpopular user interaction in the recommended user interactions;

determining if the utilization metric associated with the most unpopular visualization type is less than a second threshold;

in the event it is determined that the utilization metric associated with the most unpopular visualization type is less than the second threshold, excluding the most unpopular visualization type from the recommended visualization types; and in the event it is determined that the utilization metric associated with the most unpopular visualization type is greater than the second threshold, keeping the most unpopular visualization type in the recommended visualization types; and receiving zero or more changes to the recommended user interactions and recommended visualization types in order to obtain the selected user interactions and the selected visualization types;

determining, based at least in part on the selected user interactions and the selected visualization types, the predetermined visualization data associated with displaying the interactive data analysis document, wherein the determination of the predetermined visualization data is performed on a data analysis server;

storing the predetermined visualization data determined by the data analysis server on a computing device; and displaying the interactive data analysis document on the computing device, including by accessing the predetermined visualization data stored on the computing device such that the computing device is able to display the interactive data analysis document without communicating with the data analysis server in response to a decision that a connection to the data analysis server is too slow or is unavailable.

12. The computer program product recited in claim 11, wherein the predetermined visualization data is output to one or more of the following: a smartphone, a tablet, a smartwatch, a smart TV, a laptop, or desktop computer.

13. The computer program product recited in claim 11, wherein the selected visualization types includes one or more of the following: a map, a scatter plot, a grid of same visualization types, a grid of different visualization types, a tree map, a parallel coordinate plot, a line chart, a table plot, a bar graph, a pie chart, a donut chart, or a KPI tile grid.

14. The computer program product recited in claim 11, wherein displaying the recommended user interactions and the recommended visualization types includes:

analyzing historic usage information associated with a full-featured interactive data analysis document, not supported using the predetermined visualization data, in order to determine one or more popular user interactions and one or more popular visualization types; and making at least one of the popular user interactions a recommended user interaction and at least one of the popular visualization types a recommended visualization type.

15. The computer program product recited in claim 11 further comprising computer instructions for:

receiving one or more of the following: (1) an additional user interaction, not included in the selected user interactions, for which there is no predetermined visualization data or (2) an additional visualization type, not included in the selected visualization types, for which there is no predetermined visualization data;

determining requested, additional visualization data using one or more of the following: the additional user interaction or the additional visualization type;

determining anticipatory, additional visualization data using one or more of the following: (1) a user interaction, other than the selected user interactions or the additional user interaction, for which there is no predetermined visualization data or (2) a visualization type, other than the selected visualization types and the additional visualization type, for which there is no predetermined visualization data; and outputting the requested, additional visualization data and the anticipatory, additional visualization data.

* * * * *